United States Patent [19]

Romero et al.

[11] 3,745,259

[45] July 10, 1973

[54] PATH SELECTION CIRCUIT FOR AN END MARKED NETWORK

[75] Inventors: Roderic Romero, Boulder; Louis Emanuel Thelemaque, Longmont, both of Colo.

[73] Assignee: Bell Telephone Laboratories, Incorporated, Murray Hill, N.J.

[22] Filed: Aug. 23, 1971

[21] Appl. No.: 173,930

[52] U.S. Cl. .............................................. 179/18 GE

[51] Int. Cl. .............................................. H04q 3/49

[58] Field of Search .................... 179/18 GE, 18 GF, 179/175.23, 175.21

[56] References Cited

UNITED STATES PATENTS

| | | | |
|---|---|---|---|
| 3,311,708 | 3/1967 | de Kroes | 179/18 AB |
| 3,349,186 | 10/1967 | Bereznak | 179/18 GF |
| 3,531,773 | 9/1970 | Beebe | 179/18 GF |
| 3,573,384 | 4/1971 | Konidaris | 179/18 GF |
| 3,586,784 | 6/1971 | Bhusri | 179/18 GF |

*Primary Examiner*—Thomas W. Brown
*Attorney*—W. L. Keefauver

[57] ABSTRACT

A switching system is disclosed having an end marked network together with facilities for selecting any one out of a plurality of possible network paths for use on a connection between a preselected line side circuit and a preselected trunk side circuit. The successive use of these facilities enables all possible paths between the two preselected circuits to be seized one at a time.

16 Claims, 12 Drawing Figures

INVERTING AND GATE

INVERTING OR GATE

PATH SELECTION CIRCUIT FOR AN END MARKED NETWORK

BACKGROUND OF THE INVENTION

This invention relates to a switching system, and in particular to a switching system having an end marked network. The invention further relates to a switching system having facilities for interconnecting two traffic circuits via a preselected network path.

Switching systems equipped with end marked networks are known. In such systems, connections are established between the line side and trunk side circuits by applying marking potentials to the network. The network responds to the marking potentials and establishes a connection between the two circuits whose network appearances are marked.

End marked networks are said to be self-controlled in that they operate on their own to select and establish connections between traffic circuits associated with marked terminals. The use of such networks lessens the complexity of the system control circuitry. The reason for this is that, in order to establish a connection between a specified line side and a specified trunk side circuit, the only requirement of the system control is that it apply a marking potential to the network appearances of the two circuits. The network responds to the marking potentials, determines whether an idle path is available, and if it is, establishes a path of its own selection. This mode of operation frees the system controller from the task of determining which of a plurality of idle paths is to be used on a given connection.

Although the use of an end marked network simplifies the design of the system controller, and is otherwise desirable for various reasons, the fact that common control does not select the path that is to be used on a connection presents certain problems with regards to maintenance and testing. By way of contrast, in crossbar type systems, it is possible for the controller to preselect and seize any one of a plurality of paths interconnecting a given line side with a given trunk side circuit. This capability is useful for maintenance purposes where suspected troubles may be in the network. However, since end marked networks establish paths on a self-seeking basis independent of the rest of the system, a maintenance man has no control over the selection of the path that is to be used on a connection. This complicates the maintenance and testing of such systems.

SUMMARY OF THE INVENTION

It is, therefore, an object of the invention to provide facilities for preselecting the network paths that are to be used on the call connections in an end marked switching system.

It is a further object to preselect each and every segment of a path that is used on an interconnection between two preselected traffic circuits.

SUMMARY DESCRIPTION OF THE INVENTION

A switching system is provided in accordance with the present invention which has facilities for selecting the specific network path that is to be used on a call connection between a preselected pair of traffic circuits. The selected network path is then used on the connection even though there may be a plurality of idle paths between the two circuits when the connection is attempted.

Our invention is disclosed as embodied in a four stage end marked network. The four stages may be functionally subdivided into line modules and trunk modules; junctors interconnect the two types of modules. Each module itself comprises two switching stages which are interconnected with each other by links.

Each module includes solid state logic circuitry which controls the operation of the switch units of the module in response to the marking potentials applied by the traffic circuits. This logic circuitry detects the receipt of a marking potential from a requesting traffic circuit and, in response thereto, determines which links within the module are currently available for use in establishing a path from the traffic circuit and through the two stages of the module to the junctors. Each link that is available extends a priming potential through the second stage of the module to logic circuitry associated with the junctors.

The invention also includes a continuously running junctor scanner which tests the state of all junctors one at a time in sequence. By means of the junctor logic circuitry, the scanning of an idle junctor causes it to be selected for use on a connection if the junctor comprises a portion of an idle path between two bidding traffic circuits. The first such idle junctor that is scanned is normally the one that is used on a call. In other words, the application of a marking potential by a bidding line side causes one or more line module links to apply a first priming potential to a plurality of junctor monitoring gates in the line module, provided that at least one or more links serving the bidding line circuit are currently available. In addition, all junctor monitoring gates receive a second priming from heir sleeve lead when their associated junctors are idle. Only those junctors whose monitoring gates are double primed may be selected to establish a call connection between the calling traffic circuits.

The scanner normally scans all junctor monitoring gates. The scanning of a junctor monitoring gate that is currently receiving double priming potentials results in a signal to the trunk module connected to the junctor indicating an idle path to the trunk module from a bidding line side circuit. When the scanner scans a junctor that is double primed and connected to the trunk module containing the bidding trunk side circuit, the scanner stops and selects the junctor for use on the connection, provided that the trunk link between this junctor and the bidding trunk side circuit is idle. The network control circuitry detects the stopping of the scanner and closes the necessary switch contacts to establish a path between the bidding traffic circuits. This path includes the junctor selected by the scanner, the link of the line module that is currently applying a priming potential to the selected junctor, as well as the available link of the trunk module between the junctor and the bidding trunk circuit. The operation of the scanner resumes after the network path is established and at that time the priming potential is removed from all of the other junctors so that they may be used on other calls.

Further in accordance with our invention, circuitry is associated with the scanner which, in order to facilitate maintenance and testing, permits any junctor to be preselected for use on a connection between a selected pair of traffic circuits. The configuration of the network is such that the selection of the junctor defines a unique network path between the traffic circuits that are to be interconnected. The scanner circuitry that effects the seizure of a selected junctor includes a plurality of setup switches, together with logic circuitry for momentarily disabling the scanner and gating the output of the switches as simulated scanning signals to the junctors. The simulated scanning signals are applied only for the time required for the system to respond to the marking signals from the traffic circuits and in response thereto, to seize the selected junctor and establish a network path over it. The scanner is disabled only momentarily and as soon as the preselected network path is established, the scanner is reactivated and made available for use on other calls.

After the connection is established, a maintenance man may perform any tests that may be required. Since there are a plurality of network paths between any two traffic circuits, the maintenance man may release the first connection after he has tested it to his satisfaction, readjusts the setup switches to specify another junctor, and then initiate a new call from the same line side circuit to the same trunk side circuit. This permits another network path between the same two circuits to be tested. These operations may be repeated as often as may be required so that all possible paths may be seized, one at a time, for testing.

A feature of this invention is the provision of a system having an end marked network together with circuitry for preselecting the network path to be used on a connection between two selected traffic circuits.

A further feature is the provision of circuitry for momentarily gating simulated scanning signals to all network junctors in order to specify the network path that is to be used on a connection between the two traffic circuits.

A further feature is the provision of gating circuitry for overriding a scanner during the establishment of the call connection and for momentarily gating the output of manually adjustable setup switches to the junctors as simulated scanning potentials during the period of time required to establish the network connection.

DRAWING

These and other objects and features of the invention will become apparent from a reading of the following description of the invention taken in conjunction with the drawing in which:

FIGS. 1A and 1B, when arranged with respect to each other as shown in FIG. 1C, diagrammatically disclose a system embodying the invention;

FIG. 2A, 2B, 2C, 2D, 2E, when arranged with respect to each other as shown in FIG. 2F, illustrate the system of FIGS. 1A and 1B in further detail;

FIGS. 3A, 3B, and 3C illustrate the details of the logic circuits shown on FIGS. 1 and 2.

GENERAL DESCRIPTION - FIGS. 1A, 1B, and 1C

Normal System Operation

The present invention is shown as embodied in a PBX of the type disclosed in the H. H. Abbott et al. U.S. Pat. No. 3,377,432, of Apr. 9, 1968 as well as in application Ser. No. 97,200 filed Dec. 11, 1970, now U. S. Pat. No. 3,701,863, issued Oct. 31, 1972, entitled Test Circuit and listing D. M. P. Eisenlohr and R. Romero as coinventors. The Abbott et al and the Eisenlohr et al specifications are incorporated as a part of the present application to the same extent as if fully disclosed herein.

The disclosed system is of the wired logic electronic type and includes an end marked network. The network is of the type generally well known in the art and shown, in particular, in application Ser. No. 145,734, filed May 21, 1971 in the name of L. E. Thelemaque and now U.S. Pat. No. 3,692,943 issued Sept. 19, 1972. As shown on FIG. 1A, the network comprises a line module on its left side and a trunk module on its right side. Each module contains eight primary switches (PSW0 . . . PSW7) and eight secondary switches (SSWO . . . SSW7). Primary switches are connected to the traffic circuits (LCOO - - - LC77 and TC00 - - - TC77) served by the modules; link paths (LK00 - - - LK77) interconnect the primary and secondary switches of a module with each other; junctors (J00 - - - J77) interconnect the secondary switches of the line module with the secondary switches of the trunk module. The equipment shown on FIG. 1A, for the most part, is designated in an octal code form. The reason for this is that there are eight switches in each group with each switch being of the matrix type and having eight verticals and eight horizontals. Accordingly, the links interconnecting the primary and secondary switches are designated as L00 through L07, L10 through L17 . . . L70 through L77. The junctors J00 through J77 and the traffic circuits are designated in a corresponding manner.

Each line side circuit (LC00 - - - LC77) as well as each trunk side circuit (TC00 - - - TC77) is connected to the switching network by four conductors designated T, T, S, and M. The T, R, and S conductors are the conventional tip, ring and sleeve conductors and they extend from the traffic circuit to an individual appearance on a primary switch. The M-lead for each traffic circuit extends into its module and within the module is connected to logic circuitry not shown on FIG. 1A. Thus, line side circuit LC00 is connected by its T, R, and S conductors to primary switch PSW0 and is further connected by its conductor M00 to the line module and to logic circuitry within the line module.

The switching system of FIGS. 1A and 1B is of the common control type in which the common control circuit 102 governs the order in which the traffic circuits are interconnected by the network during the serving of a call. Common control receives service requests from the line side circuits and the trunk side circuits. Upon the receipt of each request, it sets mode circuit 141 to a state unique to the request. The mode circuit and the common control together regulate the operation of the requesting traffic circuit and control the establishment of a connection between the requesting circuit and any other traffic circuit with which it must be connected.

As is described in detail in the Abbott et al patent, as well as in the Eisenlohr et al. specification, the line scanner 106 scans the line side circuits LC00 through LC88 to enable the system to detect any supervisory change of states within the line side circuits. The supervisory change of states signals are detected by the line circuit signal translator 107. This circuit translates the signals and informs common control 102 regarding the current status of each call served by a line side circuit. The connecting conductors between the line side circuits, the line scanner 106 and the translator 107 are not shown in complete detail on FIGS. 1 in order to minimize the complexity of the drawing since the details are not necessary to an understanding of our invention. These connections are shown in detail in the Abbott et al. and the Eisenlohr et al. specifications.

The trunk bid and selection circuit 109 comprises part of common control 102 and is connected by path 108 to all of the trunk side circuits. It permits common control to communicate with the trunk side circuits so that they may be selectively seized for use on a call and so that their supervisory state may be monitored. Each trunk side circuit has a supervision circuit, designated diagrammatically as SUPV on FIG. 1A. Each supervision circuit is connected: (1) via conductors 108 to the trunk bid and selection circuit 109, (2) to an M-conductor, and (3) to the swinger contact of a test switch TSW-. The test switch for trunk side circuit TC00 is designated TSW00. Each test switch has two stationary contacts, designated NS and SEL, which are connected over correspondingly designated conductors to the output of the test and control circuit 111.

The following briefly summarizes the operation of that portion of the end marked system of FIGS. 1 that is described in detail in the Abbott et al and Eisenlohr et al. specifications. Common control 102, by means of the line scanner 106, monitors the line side circuits and, upon the detection of a change of state in one of them, initiates the circuit actions required to interconnect the bidding line side circuit with a trunk side circuit so that the trunk side circuit may furnish the call service or interconnection facility required for further serving the call. When a connection is to be established to a selected trunk side circuit, common control causes a ground or marking potential to be applied to the M - - leads of both the calling line side circuit and the selected trunk side circuit. The switching network responds to the M - - lead grounds and establishes a path of its own selection, without further assistance from common control, between the two traffic circuits. After the path is established, common control furnishes whatever additional service may be required at the time and then advances to serve other calls.

Let it be assumed that a connection is to be established between line side circuit LC00 and trunk side circuit TC00. Upon the initiation of a call from the line side circuit, common control detects the service request, selects idle trunk side circuit TC00, and causes both circuits to apply a marking potential over their M - - leads to their appearances on the network. The network then proceeds on its own in response to the marking potentials, selects an idle link and junctor path between the two circuits, and closes the switch crosspoints of the selected path to complete the interconnection.

From an inspection of FIG. 1A it may be seen that a plurality of network paths may be used to interconnect line side circuit LC00 with trunk side circuit TC00. One path conprises line module link LK00, junctor J00, trunk module link LK00. Another path comprises line module link LK07, junctor J70, and link LK00. The selection of the particular path that is to be used depends upon the current idle-busy status of the various links and junctors as well as the order in which the junctors are scanned. The details of the logic circuitry which detects the busy-idle state and which cooperates with the scanner to select an idle junctor is shown in detail in FIGS. 2. On FIGS. 1 this circuitry is shown diagrammatically for the most part and includes the junctor monitoring or selection gates F00 through F77 which are associated with the junctors J00 through J77, respectively.

The ground on the M00 lead of circuit LC00 extends to logic circuitry within the line module which determines which of links LK00 through LK07 are currently idle. For each link that comprises part of an available path to an idle junctor, the logic circuitry extends the ground on the M00 conductor to input 2 of the monitoring or selection gate (F - - ) for the junctor. Let it be assumed that link LK00 is currently idle. In this case, the marking potential on lead M00 is extended to input 2 of gate F00 for junctor J00. A priming potential is applied to input 1 of a junctor selection gate whenever its junctor is idle. Thus, if junctor J00 is idle, both of input terminals 1 and 2 of gate F00 are primed.

The scanner is of the continuously running type in which it advances step by step, and applies a priming potential to a junctor gate (F - - ) each time it scans it. Let it be assumed that the scanner advances to junctor J00 to scan it. At this time, the output of the scanner applies a scanning potential to scan conductor SC00 which is connected to input 3 of gate F00. The gate now turns on since all three of its inputs are concurrently primed. The turn on of the gate applies an output potential over path FA00 to the trunk module which, as shown in FIG. 1A, attempts to complete a connection between junctor J00 and traffic circuit TC00. It may be seen from an inspection of the trunk module that this connection would require the availability of link LK00 and its associated crosspoints in secondary switch SSW0 and primary switches PSW0 of the trunk module. If all of these elements are currently idle, the connection is established over this path as subsequently described in detail in FIG. 2. On the other hand, if all elements of this path are not available, the scanner continues to advance and scans another junctor in an attempt to complete the connection. Thus, if link LK00 in the trunk module is not available, the scanner advances and scans another junctor such as J77. Let it be assumed that junctor J77 is idle, and that link LK07 is available to establish a line module path between circuit LC00, primary switch PSW0, secondary switch SSW7, and junctor J77. Input 2 of gate F77 is primed upon the extension of the marking potential from traffic circuit LC00, input 1 is primed since the junctor is idle, input 3 is primed from the scanner via conductor SC77. This being the case gate F77 turns on and applies an output signal over path FA77 to the logic circuitry of the trunk module. By inspection, it may be seen that the completion of a connection to traffic circuit TC00 from junctor J77 requires the availability of link LK70 of the trunk module. If link LK70 is available, the path is completed. If link LK70 is not available, the scanner continues to advance to another junctor in an attempt to complete the connection.

It may be seen from the preceding that selection of the path that is to be used on a connection is independent of common control and is governed by a number of factors within the switching network itself, namely the availability of the various switch cross-points, the links, the junctors, as well as the current operable position of the scanner, namely the scanner output conductor currently receiving a priming or scanning potential.

System Operation on a Test Connection

The following describes the manner in which the equipment provided in accordance with our invention permits a selected junctor and in turn a selected network path to be used on a call connection between any two traffic circuits. Normally, the scanner applies its output to conductors SC00 through SC77 sequentially, one at a time. These outputs are applied through gates C00 through C77 and D00 through D77 to conductors SC00 through SC77. Switch NT is normally open and at such times does not allow an inhibit potential to be applied to gates C - - . Therefore, the scanning potentials pass through the C - - and D - - gates to the SC - - scanner conductors. Gates B00 through B77 are also connected via gates D - - to the SC - - scanning conductors. However, the B - - gates are normally not activated since they are connected to the normally open switch NT via gate NT. Since gate NT is normally low at its output it does not apply the potential required to the left hand input of each of the B - - gates to prime or activate them so they can respond to a signal on their right hand input.

In summary, with switch NT released, conductor 116 remains at a low potential that prevents the B - - AND gates from assuming their AND state and conductor 115 maintains the C - - gates in an uninhibited state. Under these conditions, the output of the A - - key switches of the path select circuit 113 is effectively isolated from the SC - - scanning conductors, the output of scanner 112 is extended through the C - - and D - - gates to the scanning conductors. Thus, with switch NT released, the scanner operates as already described to scan the junctors sequentially one at a time and, on each connection request to select the first idle junctor it encounters that constitutes an available path between a marked line side circuit and a marked trunk side circuit.

Let it be assumed that a test connection is to be established between line side circuit LC00 and trunk side circuit TC00. Let it further be assumed that this path is to be established over junctor J00. The following actions must first be taken to condition the system to establish this path. First, terminal 120-00 is cross connected to terminal 121 in cross connect field 110. The series of terminals 120-00 through 120-77 are associated with line side circuits LC00 through LC77 respectively. Any line side circuit may be selected for use on a call connection by cross connecting its associated terminal 120 - - with terminal 121. Secondly, the network test switch NT is operated. This allows the state of the B - - and C - - gates to be altered as subsequently described. Thirdly, path select key switch A00 is operated. This functionally selects junctor J00 for use on the call. Next, switch TSW00 in trunk side circuit TC00 is operated so that its swinger contact engages conductor SEL. Lastly, switch 151 in the test and control circuit 111 is operated. Input terminal 111A of circuit 111 is connected to output terminal 107A-00 of circuit 107. Terminal 107A-00 receives the change of state signals generated by line side circuit LC00.

As described in the Eisenlohr et al. specification, the TSW - - switches of the trunk side circuits are normally in the position shown in FIGS. 1 and switch 151 is normally released. Under those conditions, a priming potential is continuously applied to conductor NS and in turn to input 1 of the supervision portion of each trunk side circuit. This permits each such circuit to be seized for use on a call under control of the trunk bid and selection circuit 109 by means of the potentials it supplies to conductor 108 and in turn input 2 of each SUPV circuit. In other words, if switch 151 is released and the TSW - - switch of each trunk side circuit is released, the test and control circuit 111 is of no effect since it permits the trunk side circuits to be selected entirely under control of the trunk bid and selection circuit 109. However, with switch 151 operated and the TSW - - switch of a selected trunk side circuit operated, the test and control circuit 111 will apply the control potentials required to force the system when a call is placed from line side circuit LC00 to select and complete a call to the trunk side circuit whose TSW - - switch is operated. Circuit 111 is controlled in its operation by the output signals from terminal 107A-00. The call now being described is to be completed to trunk side circuit TC00 and therefore the operation of its switch TSW00, together with the operation of switch 151, will condition the system to extend the call from line side circuit LC00 to trunk side circuit TC00. This is done by causing the test and control circuit 111 to apply momentarily a select potential to conductor SEL and an inhibit potential to conductor NS when a call is placed from line side circuit LC00. The inhibit potential on conductor NS will preclude the selection of any other trunk side circuit, the select potential on conductor SEL will force trunk side circuit TC00 to be selected since its switch TSW00 is operated.

When the subset associated with line side circuit LC00 goes off-hook to initiate a call, common control detects the off-hook condition and causes circuit LC00 to ground its conductor M00. At the same time, common control determines that the calling line side circuit requires a connection to a trunk side circuit, selects trunk side circuit TC00 (since switches 151 and TSW00 are operated) and causes that circuit to ground its M00 conductor. Thus, at this time both of circuits LC00 and TC00 ground their M00 conductors to request to the network to complete a path between them. With switch NT operated, the M00 conductor ground on line side circuit LC00 is extended to its terminal 120-00, over the strap to terminal 121 and from there is extended through switch NT and thence through gates NT and B to conductor 115. The ground on conductor 115 inhibits the C - - AND gates. Gate NT inverts the M00 conductor ground to prime all of gates B - - . This effectively blocks the scanner output from conductors SC - - , and at the same time, causes the path select circuit 113 to apply simulated scanning signals to these conductors. Switch A00 is now operated to select junctor J00 and the ground from terminal 114 is removed from the right hand input of AND gate B00. This enables the gate to assume its AND state. However, all of the other B - - AND gates cannot assume their AND state since their right hand input is now grounded. This causes the output of gate B00 to apply a simulated scanning potential via gate D00 to conductor SC00 extending to the input 3 of selection gate F00 for junctor J00.

In the manner similar to that already described, the ground on conductor M00 for line circuit LC00 is extended through the line module and appears on all of the F - - selection gates whose junctors comprise part of an available network path between this line circuit and trunk side circuit TC00. Since junctor J00 is one out of the possible paths, input 2 of its selection gate F00 is now primed by the logic circuitry of the line module. Input 1 of gate F00 is primed whenever junctor J00 in the line module is idle.

Under the conditions now described, all three inputs of gate F00 are now primed and the gate therefore turns on and applies an output over path FA00 to logic circuitry (not shown in FIG. 1A) of the trunk module. The output signal from the selection gate is a service request signal to the trunk module and it requests the trunk module to connect junctor J00 with the trunk side circuit whose M-conductor is currently marked, provided link LK00 is idle in the trunk module. Since conductor M00 of the trunk side circuit TC00 is now marked and link LK00 in the trunk module is assumed idle, the output signal from gate F00 causes the trunk module to complete a path between junctor J00 and trunk side circuit TC00. When the path is established, ground is removed from leads M00 of both traffic circuits and the supervisory potential on terminal 107A-00 changes. This restores the system to normal so that it may serve other calls.

Once the path between line side circuit LC00 and trunk side circuit TC00 is established, the maintenance man may perform any tests that may be required. Subsequently, he may release the connection, release switch A00 and operate the next A - - switch whose junctor constitutes a possible path between the same two traffic circuits. Following this, he may initiate a new call from circuit LC00 to establish a path over the newly selected junctor to trunk side circuit TC00. This operation may be repeated a plurality of times in order that all possible network paths between the two traffic circuits may be selected and made available for testing.

Logic Circuits — FIGS. 3A, 3B, and 3C

The circuit embodying our invention makes extensive use of logic elements such as AND gates and OR gates. The complexity of the drawing has been reduced by representing these elements with symbols indicating their logical functions, rather than by disclosing circuit details everywhere such an element appears on the drawing.

Even though the logic symbols utilized on the present drawing are well known to those skilled in the art of logical circuit design, FIGS. 3A, 3B, and 3C disclose the details of the logic circuits used in our system. FIG. 3A discloses the details of the circuit which comprises the basic element of the logic circuits. This circuit comprises an AND NOT gate, commonly referred to as an AND or inverting AND gate. If desired, the circuit may also be operated as an inverting OR gate in the manner subsequently described. The circuit of FIG. 3A may be functionally divided into an AND gate and an inverting amplifier. The AND gate comprises diodes 301-1 through 301-N, together with resistor 302 and positive potential source 308. The inverting amplifier comprises diode 304, registers 305 and 307, and transistor 306. The operation of the AND gate is such that terminal 303 may go positive only when all of inputs 1 through N are raised above ground potential. The holding of one or more inputs at ground or negative potential will prevent terminal 303 from going positive. The inverting transistor amplifier 306 is turned off except when it receives a base current from source 308 via resistor 302 and diode 304. Source 308 is effective to supply base current to the transistor only when terminal 303 goes positive as all of the inputs 1 through N are driven positive. The turn-on of the transistor at this time lowers the potential on output conductor 310 from that of the positive source 309 to a lesser potential as determined by the IR drop across resistor 307.

It may be seen that the circuit of FIG. 3A operates in such a manner that positive going signals on all inputs turn the transistor on and produce a negative-going signal at its output. Conversely, the grounding of at least one of its inputs prevents the transistor from turning on even though the remainder of its inputs are positive. This circuit may be operated as an AND NOT circuit by maintaining one or more of its inputs low, i.e., ground, and by driving all of its inputs high for the AND condition of the circuit. When the circuit of FIG. 3A is operated as an inverting AND gate in our system, it is represented on the drawing by the symbol shown in FIG. 3B, with the plurality of input terminals 1 through N being shown on the left and with the output terminal being shown on the right.

The circuit of FIG. 3A may be operated as an inverting OR gate by normally maintaining all inputs above ground and by subsequently driving at least one input to either ground or to a negative potential to represent the OR condition. The symbol shown on FIG. 3C is utilized on the drawing whenever the circuit of FIG. 3A is operated as an inverting OR gate.

Detailed Description — FIGS. 2A, 2B, 2C, 2D, 2E, and 2F

Normal System Operation

Figure 1A:
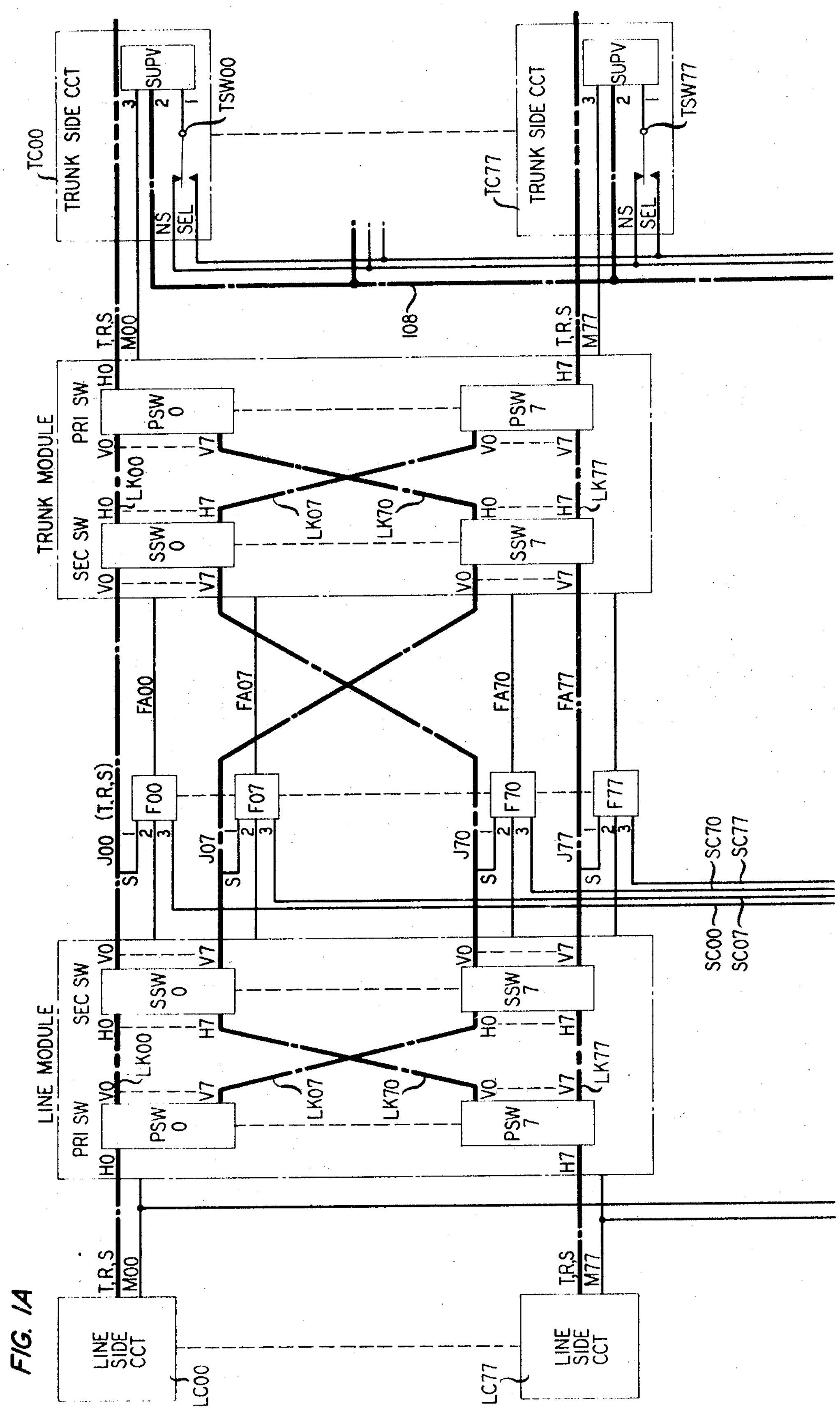
Figures 1B, 1C:
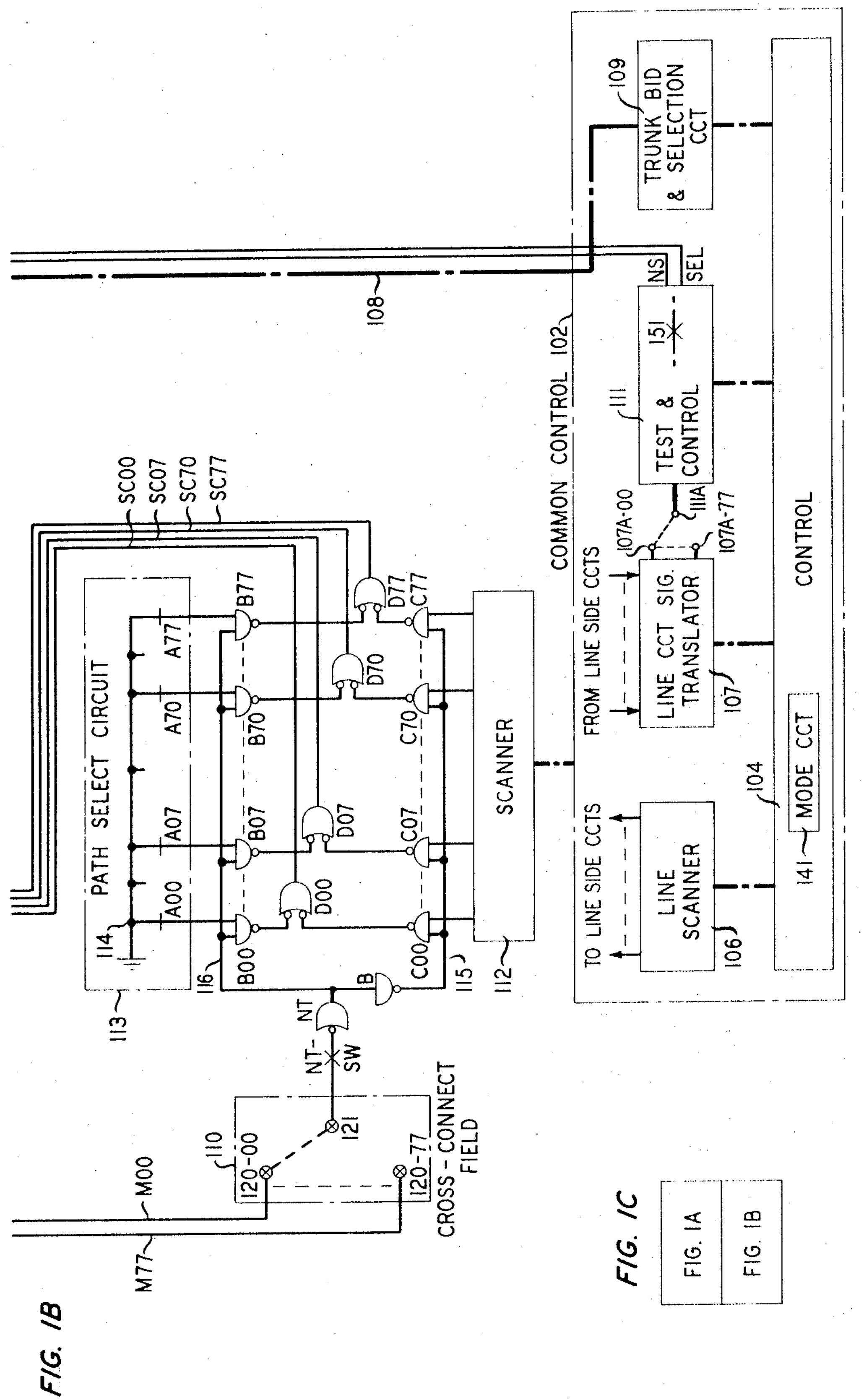
Figures 2A, 2F:
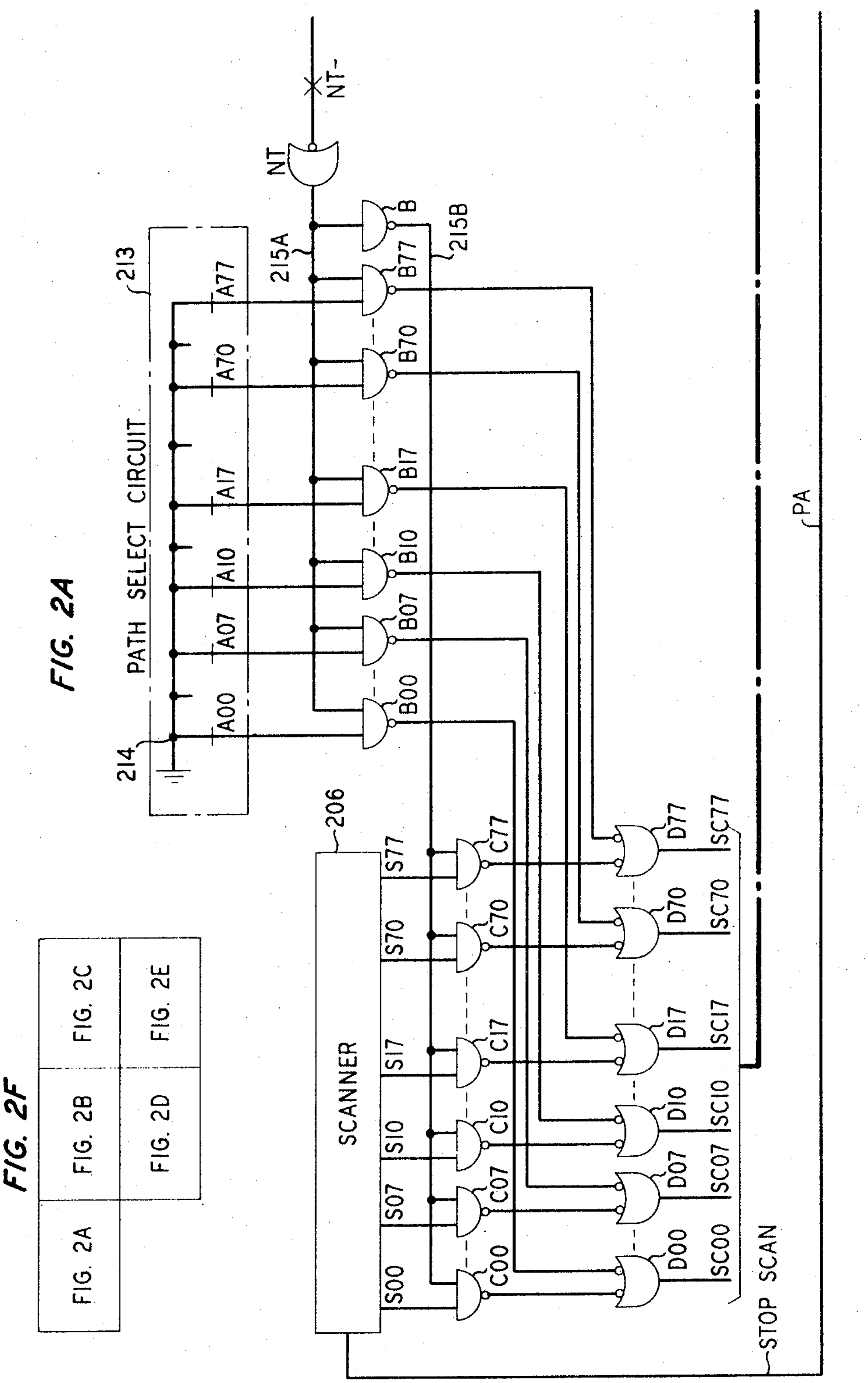
Figure 2B:
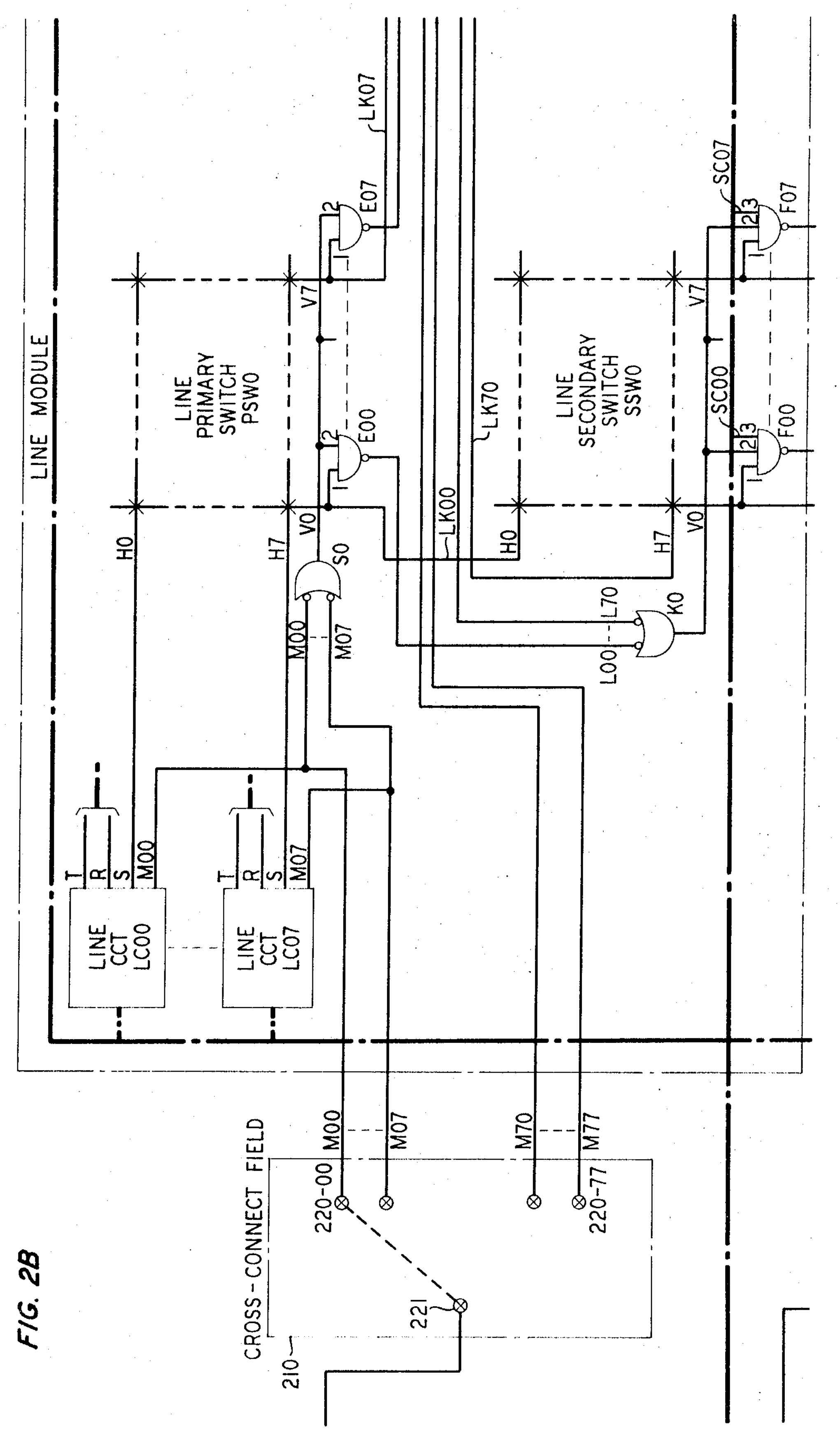
Figure 2C:
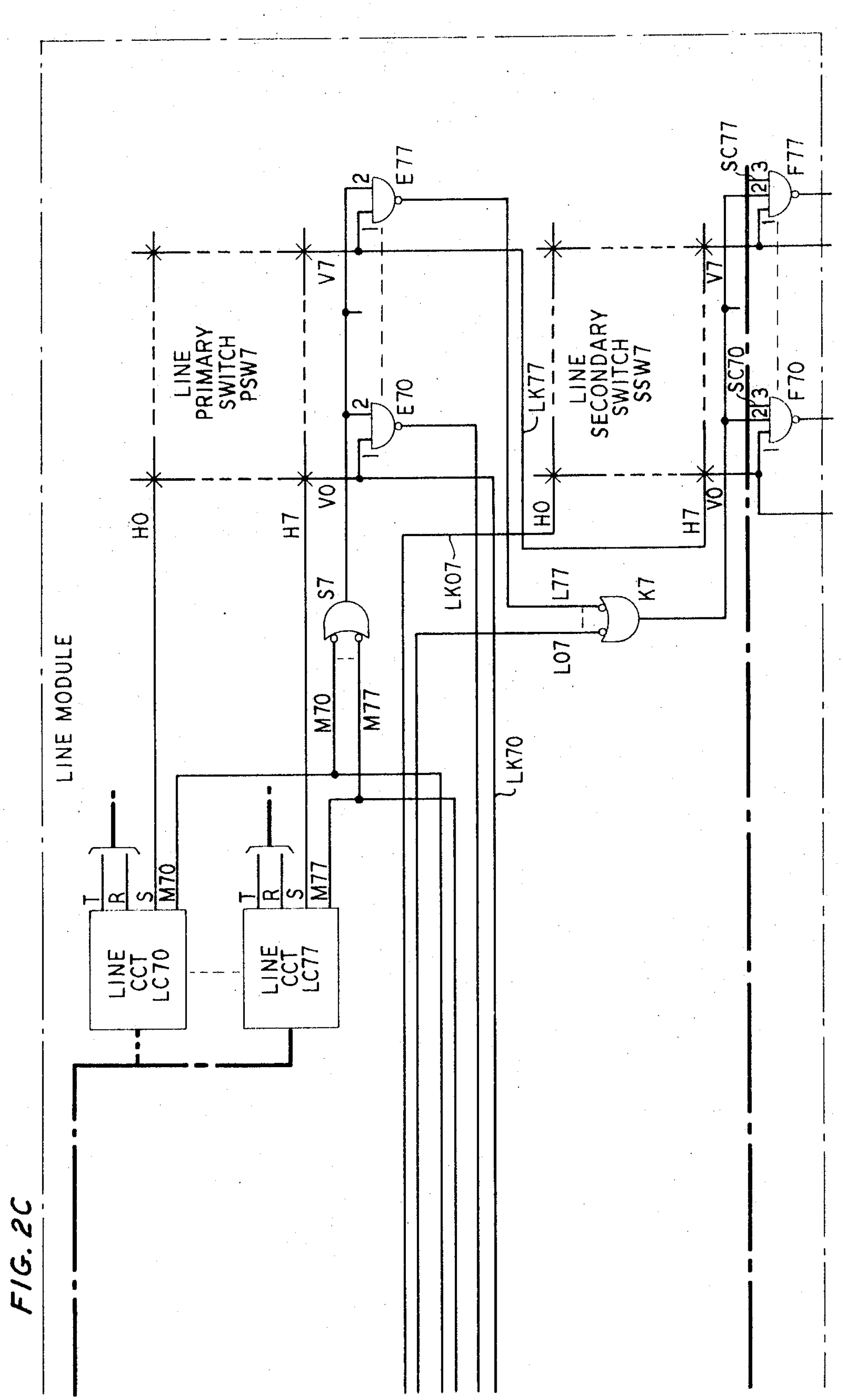
Figure 2D:
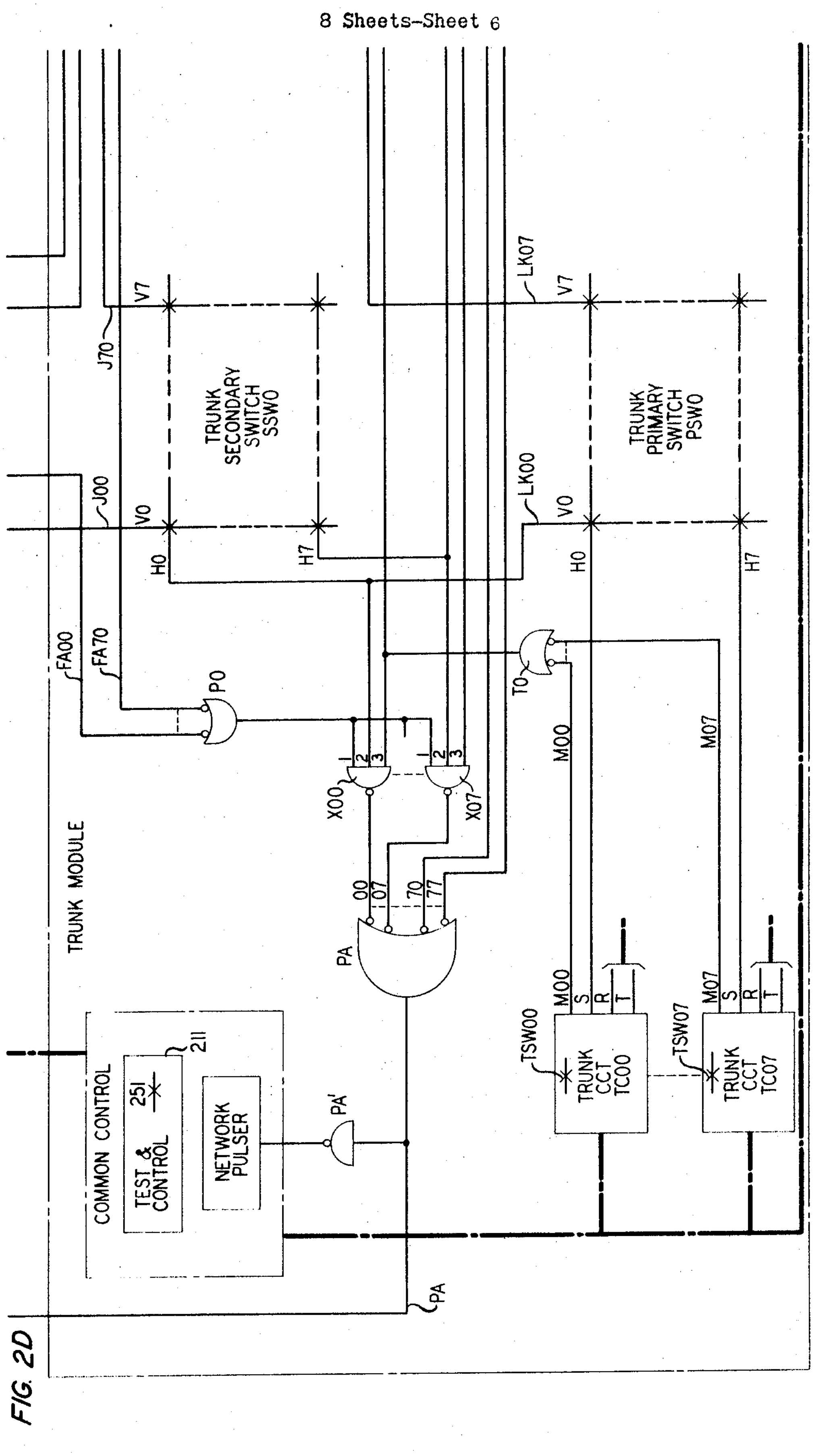
Figure 2E:
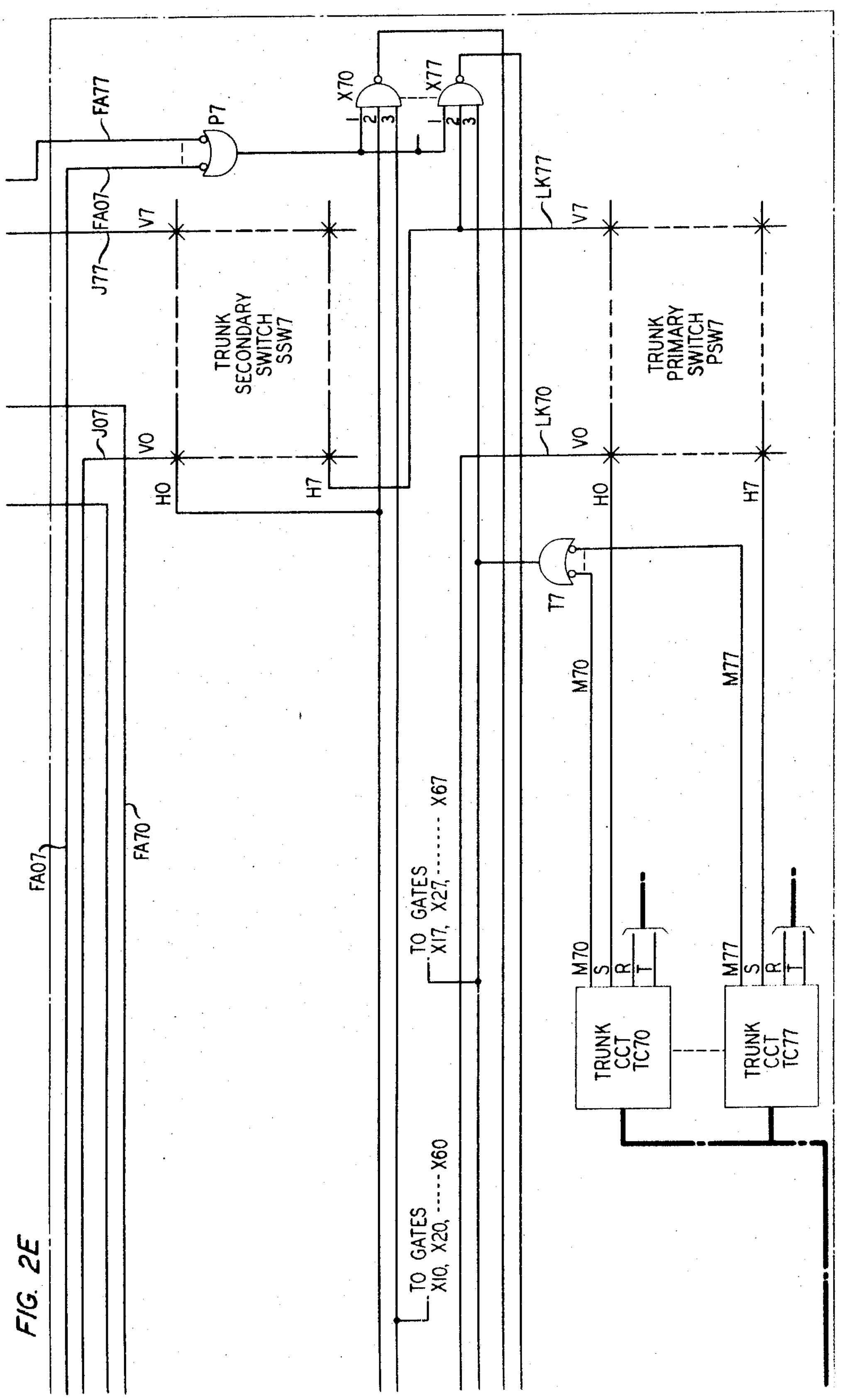

FIGS. 2A through 2E, when arranged with respect to each other as shown on FIG. 2F, illustrate further details of the system of FIGS. 1A and 1B. Like elements have similar designations where a direct correspondence exists between an element of FIGS. 1 and its counterpart on FIGS. 2. FIG. 2A discloses the details of the scanner, the path select circuit together with the logic elements associated with these two circuits. FIGS. 2B, 2C, 2D, and 2E together disclose further details of the switching network including the logic circuitry which is shown only diagrammatically on FIG. 1A. The line module is shown on FIGS. 2B and 2C; the trunk module is shown on FIGS. 2D and 2E.

In the same manner as on FIG. 1A, FIGS. 2 disclose line side circuits LC00 through LC77 and trunk side circuits TC00 through TC77. Each of these circuits is connected to the network by means of four conductors designated T, T, S, and M. FIGS. 2 disclose only the path selection and control portions of the network (as distinguished from the speech path portions). In particular, FIGS. 2 disclose the network logic circuitry connected to the M - - conductor of each traffic circuit, as well as the switch crosspoints and the logic circuitry associated with the sleeve conductor of each traffic circuit. The tip and ring conductors of each traffic circuit extend to switch elements and cross-points which are not shown on FIGS. 2 in order to minimize the complexity of the drawing.

The operation of the circuit of FIGS. 2 is first described with reference to an assumed connection between line side circuit LC00 and trunk side circuit TC00. As earlier described with respect to FIGS. 1A and 1B, common control detects the serve request from the line side circuit LC00, selects trunk side circuit TC00 for use on the call, and causes each of these circuits to mark their conductor M00. On FIGS. 2, each primary switch is associated with an OR gate whose inputs are connected to the M - - leads of the traffic circuits connected to the switch. Thus, for primary switch PSW0 of the line module, it serves line side circuits LC00 through 07 and the M - - leads of these line circuits extend to inputs M00 through M07 of the OR gate SO. OR gate TC on FIG. 2D serves trunk circuits TC00 through 07 and corresponds to gate SO of FIG. 2B.

All inputs of an OR gate are normally high, i.e., a binary "1", and the OR condition of the gate occurs when at least one of its inputs is driven low to a binary "0". At that time, the output of the gate switches from a low or binary "0" to a high or binary "1". Thus, all inputs of gate SO are normally high during the idle condition of the circuit; the output of the gate is normally low.

Each primary switch of the line module has an AND gate associated with each of its sleeve lead switch verticals. Thus, the sleeve lead verticals of switch PSW0 are associated with AND gates E00 through E07. Input 1 of each gate is connected to its sleeve vertical; input 2 of each gate is connected in common to the output of the OR gate for the switch. For switch PSW0, its OR gate SO has its output connected to input 2 of each of AND gate E00 - - E07.

Figure 3A:
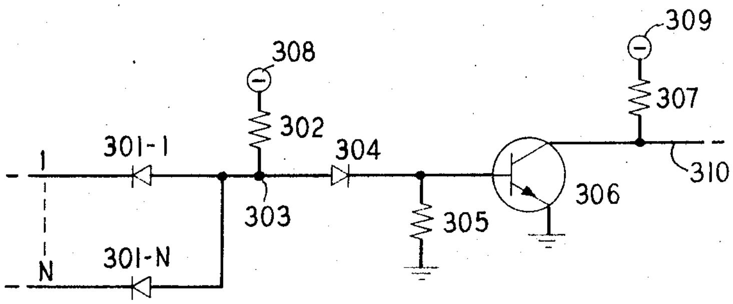
Figure 3B:
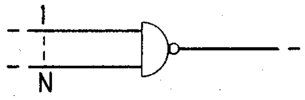
Figure 3C:
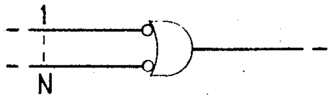

As described in connection with FIGS. 3, the AND state of an AND gate occurs when all of its inputs are HIGH. With reference to the E - - AND gates, input 1 of each gate is connected to its sleeve lead switch vertical and this input is at a high potential whenever its switch vertical is idle. Input 2 of each E - - AND gate is normally at the low potential supplied from the output of OR gate SO.

When the M00 lead of line side circuit LC00 is marked or driven to a low potential, the low appears on input M00 of gate SO. This turns the gate OFF and drives its output HIGH. This HIGH is applied to input 2 of each of AND gates E00 - - E07. Any E - - AND gate connected to an idle switch vertical at this time also has its input 2 at a HIGH potential and thus, any such gate now turns ON. In other words, if all switch verticals were idle at this time, all of gates E00 through E07 would now turn ON.

The secondary switches of each module are each associated with an OR gate individual to the switch as well as with and AND gate individual to each switch vertical. Thus, secondary switch SSW0 of the line module has OR gate K0 and AND gates F00--F07.

Let it be assumed that vertical V0 of primary switch PSW0 is idle when line side circuit LC00 marks its lead M00. This being the case, AND gate E00 turns ON and drives its output low. This low is extended over conductor L00 to an input of OR gate K0 for secondary switch SSW0. Their signal turns gate K0 off.

It may be seen that the outputs of AND gates E00 through E07 of primary switch PSW0 extend to the OR gate for each of the secondary switches of the line module, namely OR gates K0 through K7. In a similar manner, the E - - AND gates for the other primary switches of the line module similarly extend to inputs of the same OR gates. Conversely, each secondary switch OR gate has eight inputs with each input being connected to the AND gate for the corresponding verticals of the eight primary switches. Thus, the eight inputs of OR gate K0 are connected to the E - - AND gates for the 0 vertical on each of the primary switches. The same interrelationship exists between the OR gates of the other secondary switches and the AND gates for the other switch verticals. Thus, OR gate K7 for secondary switch SSW7 has its eight inputs connected to the AND gate for vertical 7 of each of the primary switches of the line module, i.e., gates E07, 17, 27 - - 77.

It has been described (1) how the turn off of OR gate SO turned ON AND gate E00 since vertical V0 of switch PSW0 is assumed to be idle and (2) how OR gate K0 received a binary zero at its input from gate E00 to turn it OFF. In a similar manner, any of the other E - - AND gates of switch PSW0 associated with idle verticals will also turn ON and, in turn, will transmit a signal to an OR gate of a secondary switch to turn the K- OR gate OFF in the same manner as for OR gate K0.

The horizontal of each secondary switch of the line module is connected to the vertical of a different primary switch in the same module. Thus, each horizontal of secondary switch SSW0 is connected to vertical V0 of a different one of the primary switches. Conversely, the verticals of each primary switch extend to the same numbered horizontal on each of the different secondary switches of the same module.

The verticals of each secondary switch of the line module are connected to a vertical of a secondary switch of the trunk module with the verticals of switch SSW0 of the line module being connected to vertical V0 of each secondary switch of the trunk module. Also, each vertical of the secondary switches of the line module are connected to an individual one of a series of AND gates designated F00 through F77. Vertical V0 of switch SSW0 is connected to input "1" of AND gate F00. AND gates F00 through F77 are analogous to gates E00 through E77. Both series of gates serve essentially the same function, namely to extend a seizure signal forward whenever the gate is energized at one of its inputs by its OR gate provided that, at the same time, its switch vertical is idle and available for use on a call. With respect to AND gate F00, input "1" is connected to the switch vertical V0, its input 2 is connected to the output of OR gate K0, and its input 3 is connected to the output of the scanner circuitry of FIG. 2A.

Upon the turn off of OR gate K0 in response to its reception of the signal from AND gate E00, the output of the gate K0 applies a priming potential to input 2 of all AND gates for switch SSW0, namely AND gate F00 through F07. Input 1 of each AND gate is primed whenever its associated switch vertical is in an idle condition. Thus, under the call conditions now described, all of AND gates F00 through F07 associated with idle switch verticals are primed on each of their first two inputs. Input 3 of each of the F - - series of AND gates is connected to one of the scanner output conductors with scanner output conductor SC00 being connected to input 3 of gate F00. Even though a plurality of F - - gates may be primed on both of their first two inputs in response to the reception of a call connection request, it is the output of the scanner that determines which one of the partially primed AND gates will turn ON and be used to establish a network connection forward to the marked trunk side circuit. Let it be assumed that scanner conductor SC00 is currently at a HIGH potential while all of the other scanner output conductors are grounded. This being the case, the HIGH on conductor SC00 primes input 3 of gate F00 and causes the gate to turn ON and assume its AND state. The turn ON of gate F00 extends a potential over conductor FA00 to an input of OR gate PO to switch it to its OFF or OR state. OR gate PO is individual to trunk module secondary switch SSW0; the remaining one of gates P1 through P7 are each individual to the remaining ones respectively of secondary switches SSW1 through 7 of the trunk module.

The series of AND gates designated X00 through X77 are analogous to the E - - AND gates for the line module primary switches as well as to the F - - AND gates for the line module secondary switches. Each of the X - - AND gates is individual to a different horizontal of one of the trunk secondary switches. Gates X00 through X07 are individual to horizontals H0 through H7 respectively of trunk module secondary switch SSW0 for example.

Each X - - AND gate has three inputs. Input 1 is connected to a P- OR gate. For example, the output of OR gate PO is connected to input 1 of gates X00 through X07. Input 2 of each X - - AND gate is connected to the trunk secondary switch horizontal to which the gate is individual. For example, input 2 of gate X00 is connected to horizontal H0 of trunk secondary switch "0". Input 3 of each AND gate is connected to an output of one of OR gates T0 through T7 each of which is individual to one of trunk primary switches PSW0 through PSW7. Thus OR gate T0 is individual to switch PSW0 and the output of the OR gate is connected to the input 3 of AND gate X00 as well as gates X10, X20, . . . X70. The horizontal of each trunk secondary switch is connected to an individual trunk module primary switch vertical. Thus, horizontal H0 of secondary switch SSW0 is connected to horizontal V0 of primary switch PSW0.

From the preceding it may be seen that the conductive state of each X - - AND gate, such as X00 for example, is controlled by three portions of the circuit, namely, from the output of the OR gate for the trunk module secondary switch, from the busy-idle state of its associated secondary switch horizontal, as well as from the conductive state of an OR gate for the trunk primary switch.

Thus, with respect to gate X00, it is controlled jointly by OR gate PO, by gate TO, and by the idle state of horizontal H0 of trunk module secondary switch SSW0. As already mentioned, gate PO has priorly turned OFF from gate F00 and is currently applying a priming switches to input 1 of all of the AND gates to which it is connected including AND gate X00. It is assumed that horizontal H0 of switch SSW0 is now idle and therefore, input 2 of AND gate X00 is primed. It has also been assumed that trunk side circuit TC00 is applying a ground marking potential to its lead M00 as a network connection request. This turns off OR gate T0 and the output of gate T0 primes input 3 of AND gate X00. Thus, all three inputs of the AND gate are now primed, the gate turns ON, switchs to its AND state, and drives its output low extending to input 00 of OR gate PA.

OR gate PA now switches to its OFF state and applies a HIGH to its output. This HIGH is extended over conductor PA and applied to the scanner as a temporary stop scan signal. This signal suspends the scanning operation for the period of time required for the network to establish the path that has just been selected (but not yet established) between line side circuit LC00 and trunk side circuit TC00. The high on conductor PA is also applied to the input of gate PA whose output extends to the network pulsers within common control. In a manner well known in the art and as shown in the aforementioned Thelemaque patent, the pulser responds to this signal and applies a current pulse to the control windings of the ferreed networks so that a path is set up between the line side circuit LC00 and the trunk side circuit TC00. The common control detects the establishment of the network path, removes the signals for conductors M00. This de-energizes the gates on FIGS. 2 and removes the stop scanner signal from the scanner which then resumes operation.

The preceding has described how a network path between two bidding traffic circuits is established under control of the scanner. For the connection just described, it was assumed that the first available junctor to be scanned following the application of marking potentials was junctor J00 and therefore gate F00 turned on in response to the scanning operation and applied the necessary signals through gates P0 and X00 and PA to pulse the scanner for the time required to establish a network path. If vertical V0 of trunk module secondary switch SSW0 had been busy at the time, gate F00 could not have turned ON, the scanner would have continued its operation and the network would have attempted to complete the connection over the next available junctor. The next path is not shown in detail. However, from inspection of the drawing it may be seen that it would extend from vertical V1 of the line module secondary switch SSW0, to vertical V0 of trunk module secondary switch SSW1 (not shown) and from there through horizontal H0 of this switch to vertical V1 of trunk module primary switch PSW0. If that path had been idle at the time, its AND gate F01 (not shown) would turn ON. This would turn on and AND gate X10 (not shown) which would apply a signal to OR gate PA to terminate the scanning and establish the network path in the same manner as already described.

Other paths could also be used on the connection. The path through line module secondary switch SSW7 that could be used would comprise vertical V7 of line module switch PSW0, link LK07, horizontal H0 of secondary switch SSW7, vertical V7 of the same switch, junctor J77, vertical U7 of trunk module secondary switch SSW7, horizontal H0 of the same switch, link LK07, vertical V7 of trunk module primary switch PSW0, horizontal H0 of the same switch, to the sleeve lead of trunk circuit TC00.

System Operation on a Test Connection

The following describes the manner in which the circuitry of FIG. 2A causes a simulated scanning potential to be applied to a selected one of the conductors SC00 through SC77 in order to seize the junctor associated with the selected scanning conductor for use on a connection between a preselected line side and preselected trunk side circuit. Normally, switch NT (FIG. 2A) is released. This opens the input of OR gate NT and permits its input to stay at a high potential. This holds the gate in an ON state in which its output is low. Under such conditions, conductor 215A is low and this maintains all of AND gates B00 through B77 in an off or inhibited state in which they cannot turn on regardless of the state of the path selected keys A00 through A77 which are connected to the left-hand input of each AND gate. The low on conductor 215A is inverted by gate B and the output of this gate applies a high over conductor 215B to the right-hand input of each of gates C00 through C77. This high permits each gate to turn ON under control of the scanner as its advances through its various operative positions one at a time in sequence. In so doing, it applies a high potential to the output conductor for its current position and a low potential to all other conductors. The high on a conductor from the scanner causes its associated C - - gate to turn ON and to drive its output low which extends to an input of a corresponding one of OR gates D00 through D77. A low on an input of an OR gate switches it to its OR state and drives its SC - - scanning conductor to a high potential. The scanning conductors for all other gates remain at a low potential. In summary, the operation of the circuit of FIG. 2A is such that the scanning conductors SC - - are energized with a high potential sequentially one at a time while the remaining scanning conductors remain at a low potential. The application of a high potential to a scanning conductor extends the potential to input 3 of its associated junctor selection gate F - - . Thus, a high on scanning conductor SC00 drives input 3 of gate F00 high. During this time, the gate can turn ON provided that it constitutes part of an idle and an available path between two requesting traffic circuits.

Let it now be assumed that it is desired to establish a path between line side circuit LC00 and trunk side circuit TC00 over junctor J00. The cross connect field 210 is wired so that the terminal 221 is is cross connected with terminal 220-00 which is connected to mark lead M00 for line side circuit LC00. Next, test switch TSW00 in the trunk side circuit TC00 is operated in order to select it for use on the call. The manner in which this selection is accomplished is described in detail in the Eisenlohr et al. specification and has been already described briefly in connection with the system of FIGS. 1A and 1B. Next, switch 251 (FIG. 2D) in the test control circuit is operated to condition the system for a test call. Also, switch NT is operated in order to interconnect the input OR gate NT of FIG. 2A with terminal 221.

The maintenance man next initiates a call from line circuit LC00 and causes the system to connect the calling line side circuit with trunk side circuit TC00. Common control serves the call and subsequently advances to the stage in the call completion where it causes the lead M00 for both line side circuit LC00 and trunk side circuit TC00 to be grounded to apply a marking potential to network appearance of each circuit. The logic circuitry of FIGS. 2B, 2C, 2D, and 2E respond in the manner already described to select a suitable network path. The ground on conductor M00 is also extended from terminal 220-00 to terminal 221 and from there is further extended through switch NT to the input of OR gate NT. The ground on its input drives its output high. This applies a high or an enabling potential to conductor 215A which extends the right-hand input of each OR gates B00 through B70. This partially enables each of these gates. The high on conductor 215A is inverted by gate B and applied as a low to conductor 215B. This low inhibits the right-hand input of each of gates C00 through C77 and thereby effectively disables the scanner by preventing the signals on its conductor S00 through S77 from passing through the C - - and D - - gates and appearing as scanning potentials on the SC - - conductors.

Prior to initiating the call, switch A00 is operated in the path select key circuit 213. This removes the terminal 214 ground from the left input of AND gate B00 and permits it to turn on when a high appears on conductor 215A as already mentioned. The removal of the ground from the left input of the gate permits its internal circuitry as shown on FIGS. 3 to apply a high to the ungrounded input. Thus, a high is now on both the inputs of gate B00, the gate turns on and drives its output low which extends to the right-hand input of OR gate D00. This low drives the output of the gate high. This high appears as a simulated scanning signal on conductor SC00 in the same manner as if the signal had originated at the output S00 of the scanner. The high on scanning conductor SC00 applies a high to terminal 3 of selection gate F00 and thereby causes the network to select this junctor for use on the call in precisely the same manner as if it had been randomly selected by the scanner as already described.

After the system establishes the specified connection between the two priorly selected traffic circuits over junctor J00, the maintenance man may perform whatever tests he wishes, and then release the connection by going on-hook. Next, he may release switch A00 and operate another key switch in path select key circuit 213 to select another junctor for use in establishing a new and different path between the same two traffic circuits. For example, if the maintenance man operates key switch A77 and places another call from line side circuit LC00, the system will attempt to establish a path between the same two traffic circuits over junctor J77 by placing a simulated scanning potential on scanning conductor SC77. The maintenance man may repeat this sequence of operations a number of times in order to establish all possible network paths between the two traffic circuits.

An advantage of our invention is that neither the system nor any of the traffic circuits need be taken out of service for testing purposes. If the selected trunk side circuit is busy on a call at the time the test connection is attempted, the requesting line will receive a busy tone. In this event, the call connection over the selected junctor will have to be reattempted at a later time. Also, if the junctor itself is busy on another call, the connection between the two preselected traffic circuits cannot be completed at the time and will have to be retired.

The preceding has described the operation of the system with respect to the testing of all possible network paths between line side circuit LC00 and trunk side circuit TC00. A maintenance man may test all possible paths from the same line side circuit to a different trunk side circuit by releasing switch TSW00 and by operating the corresponding system for the newly selected trunk side circuit such as switch TSW77 for circuit TC77.

Also, the network paths from a line side circuit other than LC00 may be tested by rearranging the connection to terminals 121 and 111A. Thus, if the paths from line side circuit LC77 are to be tested, for example, terminal 121 would be connected to terminal 120-77 and terminal 111A would be connected to terminal 107A-77. The strapping of terminal 121 to terminal 120-77 will permit the NT switch and its associated gates to respond to the signals on mark lead M77. The strapping of terminal 111A to terminal 107A-77 will permit the test and control circuit 111 to respond to supervisory change of state signals generated within line side circuit LC77.

What is claimed is:

1. In a switching system, an end marked network having a line side and a trunk side, a plurality of appearances on each of said sides, a plurality of line side circuits each of which is connected to a different appearance on said line side, a plurality of trunk side circuits each of which is connected to a different appearance on said trunk side, each of said circuits having operable means for applying a marking potential to its network appearance to request a connection through said network to another one of said circuits, control means in said network responsive to the application of a marking potential to an appearance on each of said network's two sides for establishing a network path between the two marked appearances, and selection means including said control means for causing said network to establish a preselected one path out of a plurality of possible paths between any preselected one of its line side appearances and any preselected one of its trunk side appearances in response to the application of a marking potential to said preselected appearances.

2. The system of claim 1 in which said selection means comprises, normally operable scanner means for scanning said network paths one at a time, means responsive to the scanning of a path for selecting it for use on a connection if said path comprises a possible interconnection path between a currently marked line side appearance and a currently marked trunk side appearance, selectively controllable means responsive to the marking of said preselected line side appearance and said preselected trunk side appearance for temporarily disabling said scanner and for applying a simulated scanning signal only to said preselected path to select it for use on said connection, and means responsive to said selection for causing said network to complete a connection between said preselected appearances over said preselected path.

3. The system of claim 2 in combination with means responsive to the completion of said selected path for enabling said scanner so that it resumes the scanning of said paths for the serving of subsequently received connection requests.

4. In a switching system, an end marked network having line side modules and trunk side modules, a plurality of appearances on each of said modules, a plurality of line side circuits each of which is connected to a different one of said appearances on said line side modules, a plurality of trunk side circuits each of which is connected to a different one of said appearances on said trunk side modules, a primary and a secondary switching stage in each of said modules, links connecting the two stages within each module, a plurality of junctors interconnecting said line side and trunk side modules, each of said circuits having means for applying a marking potential to its appearance to request a connection through said network to another one of said circuits, control means in said network responsive to the application of a marking potential to an appearance on both a line side and a trunk side module for establishing a path through said modules and over any one of said junctors between the two marked appearances, and selection means including said control means for causing said network to establish a connection over a preselected one of said junctors between any preselected one of its line side module appearances and any preselected one of its trunk side module appearances in response to the application of a marking potential to said preselected appearances.

5. The system of claim 4 in which said selection means comprises, normally operable scanner means for scanning said junctors one at a time, means responsive to the scanning of a junctor for selecting it for use on a connection if said junctor comprises an available path between a currently marked line side appearance and a currently marked trunk side appearance, selectively controllable means responsive to the marking of said preselected line side and preselected trunk side appearances for temporarily disabling said scanner and for applying a simulated scanning signal to said preselected junctor to select it for use on said connection, and means responsive to said selection for causing said network to complete a connection between said preselected appearances over said preselected junctor.

6. The system of claim 5 in combination with means responsive to the completion of said path for reenabling said scanner so that it resumes the scanning of said junctors.

7. The system of claim 6 in which said means for temporarily disabling said scanner and for applying a simulated scanning signal to said selected junctor comprises, scanning conductors, output conductors on said scanner means, a first set of normally enabled gates interconnecting said output conductors and said scanning conductors, a plurality of controllable switch means each of which is individual to one of said scanning conductors, a second set of normally inhibited gates interconnecting said switch means and said scanning conductors, said first set of gates being normally effective for applying scanning signals on said output conductors to said scanning conductors, said second set of gates being normally effective for blocking output signals of said switch means from said scanning conductors, said switch means being settable to specify the scanning of said selected junctor, means for interconnecting control inputs of all of said gates with the network appearance of said preselected line side circuit, means responsive to the application of a marking potential to said preselected line side appearance to alter the conductive state of all of said gates so that said scanner output signals are blocked from said scanning conductors and so that signals from said switches are applied to said scanning conductors to effect the scan of said preselected junctor, and means for switching the conductive state of both set of gates back to their normal condition upon the establishment of said network connection.

8. The system of claim 7 in combination with a selection switch having a normal and operated state in each of said trunk side circuits, and means effective when the selection switch of said preselected trunk side circuit is operated for extending a network connection over said preselected junctor from the marked appearance of said preselected line side circuit to said preselected trunk side circuit.

9. The system of claim 8 in combination with a test and control circuit, means for connecting supervisory output signals from said preselected line side circuit to an input of said test and control circuit, selection conductors extending from said test and control circuit to said trunk side circuits, test switch means in said test and control circuit for rendering said selection conductors inactive, and means effective when said test switch means is operated and a selection switch of a preselected trunk side circuit is operated for selecting said preselected trunk side circuit for use on said connection in response to supervisory signals generated by said preselected line side circuit.

10. In a switching system, an end marked network having a line side stage and a trunk side stage, a plurality of appearances on each of said stages, a plurality of line side circuits each of which is connected to a different appearance on said line side stage, a plurality of trunk side circuits each of which is connected to a different appearance on said trunk side stage, a plurality of junctors interconnecting each of said stages, each of said circuits having means for applying a marking potential to its appearance to request a connection through said network to another one of said circuits, control means in said network responsive to the application of marking potential to an appearance on both of said stages for establishing a network path through said stages and over any one of said junctors between the two marked appearances, and selection means including said control means for causing said network to establish a path over a preselected one of said junctors between any preselected one of its line side appearances and any preselected one of its trunk side appearances in response to the application of a marking potential to said preselected appearance.

11. In a switching system, an end marked network having a line side stage, a trunk side stage, and a plurality of junctors interconnecting said stages, a plurality of line side circuits each connected to a different appearance on said line side stage, a plurality of trunk side circuits each connected to a different appearance on said trunk side stage, each of said line side and trunk side circuits including means for applying a marking potential to its network appearance to request a connection through said network to another one of said circuits, and control means responsive to the application of marking potential to an appearance on both of said stages for enabling one of said junctors for establishing a network path through said stages and over said one junctor between the two marked appearances, said control means including first means responsive only to the application of the marking potentials to the appearances on both of said stages for applying an enabling potential to any of said junctors and second means including means for preselecting a specific one of said junctors and responsive to the application of the marking potentials to the appearances on both of said stages for applying an enabling potential to the preselected specific one of said junctors.

12. The system of claim 11 in which said control means comprises, scanner means for scanning said junctors one at a time, means responsive to the scanning of a junctor for selecting it for use on a connection if said junctor comprises a possible interconnection path between a currently marked line side appearance and a currently marked trunk side appearance, means responsive to the marking of one of said line side appearances and one of said trunk side appearances for temporarily disabling said scanner and for applying a simulated scanning signal only to said preselected junctor to select it for use on said connection, and means responsive to said selection for causing said network to complete a connection between said marked appearances over said one junctor.

13. In a switching system, an end marked network having a line side stage, a trunk side stage, and a plurality of junctors interconnecting said stages, means for applying marking potentials to appearances on said line and trunk side stages to request a connection through said network over any available one of said junctors, means responsive to said marking potentials for normally applying an enabling potential to any available one of said junctors to select it for use on said connection, and means for altering the operation of said last-mentioned means including means for preselecting the specific junctor to which an enabling potential is to be applied in response to said marking potentials.

14. A multistage end marked switching network in which connections are established over junctors between a traffic circuit connected to a line side network stage and a traffic circuit connected to a trunk side network stage in response to the application of marking potentials to the network appearance of the circuits to be connected, a scanner for normally scanning said junctors one at a time, said network being responsive to the scanning of a junctor to select said junctor for use on a connection if said junctor comprises part of an available path between two traffic circuits to be interconnected, settable switch means having a position individual to each of said junctors, means for preselecting two circuits between which a network connection is to be established, means responsive to the application of a marking potential by said preselected line side circuit to its network appearance for temporarily disabling said scanner and for applying a simulated scanning potential to a selected junctor under control of said settable switch means, means responsive to the establishment of a network connection between said preselected circuits over said selected junctor for disabling said switch means and for re-enabling said scanner for the serving of subsequent call connections.

15. The system of claim 14 in which the means for selecting a trunk side circuit comprises a selection switch having a normal and operated state in each of said trunk side circuits, and means effective when the selection switch of said preselected trunk side circuit is operated for enabling the extension of a network connection over said preselected junctor from the marked appearance of said preselected line side circuit to said preselected trunk side circuit.

16. The system of claim 15 in combination with a test and control circuit, means for connecting supervisory output signals from said preselected line side circuit to an input of said test and control circuit, selection conductors extending from said test and control circuit to said trunk side circuits, test switch means in said test and control circuit for rendering said selection conductors inactive, and means effective when said test switch means is operated and a selection switch of a preselected trunk side circuit is operated for selecting said preselected trunk side circuit for use on said connection in response to supervisory signals generated by said preselected line side circuit.

* * * * *

UNITED STATES PATENT OFFICE

CERTIFICATE OF CORRECTION

Patent No. 3,745,259 Dated July 10, 1973

Inventor(s) Roderic Romero and Louis E. Thelemaque

It is certified that error appears in the above-identified patent and that said Letters Patent are hereby corrected as shown below:

Column 2, line 33, change "heir" to --their--.
Column 4, line 29, change "T, T, S" to --T, R, S--.
Column 5, line 54, change "conprises" to --comprises--.
Column 10, line 41, change "T, T, S" to --T, R, S--;
line 56, change "serve" to --service--.
Column 13, line 41, change "switches" to --potential--.
Column 14, line 63, change "its" to --it--.

Signed and sealed this 20th day of November 1973.

(SEAL)
Attest:

EDWARD M.FLETCHER,JR.
Attesting Officer

RENE D. TEGTMEYER
Acting Commissioner of Patents